T. J. O'LEARY.
ATTACHMENT FOR PNEUMATIC TIRE VALVES.
APPLICATION FILED FEB. 25, 1913.
1,093,464.
Patented Apr. 14, 1914.
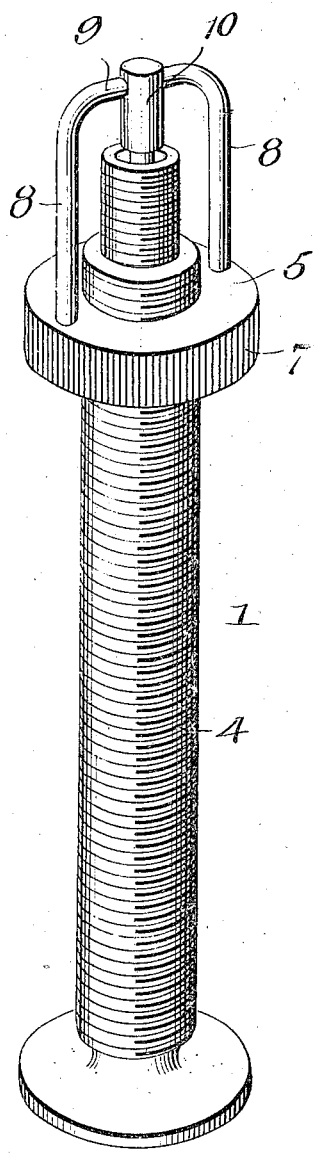
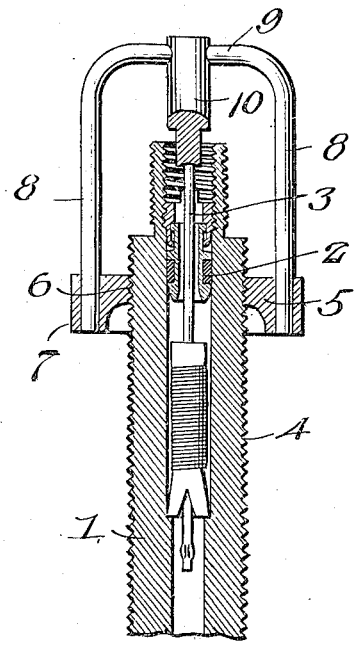
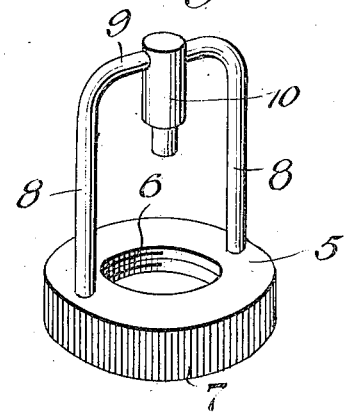
Witnesses
Inventor
Thomas J. O'Leary
By Victor J. Evans
Attorney

UNITED STATES PATENT OFFICE.

THOMAS J. O'LEARY, OF ST. PAUL, MINNESOTA.

ATTACHMENT FOR PNEUMATIC-TIRE VALVES.

1,093,464.  Specification of Letters Patent.  Patented Apr. 14, 1914.

Application filed February 25, 1913. Serial No. 750,631.

*To all whom it may concern:*

Be it known that I, THOMAS J. O'LEARY, a citizen of the United States, residing at St. Paul, in the county of Ramsey and State of Minnesota, have invented new and useful Improvements in Attachments for Pneumatic-Tire Valves, of which the following is a specification.

This invention relates to an attachment for the valves of pneumatic tires, the object of the invention being to provide a device of this character which is adjustably mounted upon the valve tube or casing and provided with means whereby the valve stem may be forced inward to unseat the valve, so that the tire may be deflated without the necessity of removing the valve from its casing.

The invention consists of the features of construction, combination and arrangement of parts hereinafter fully described and claimed, reference being had to the accompanying drawing, in which:—

Figure 1 is a perspective view showing the application of the invention to a valve of the Schrader type. Fig. 2 is a longitudinal section on an enlarged scale through the valve casing and valve opening device. Fig. 3 is a detail view of the valve opening device detached.

Referring to the drawing, 1 designates the valve tube or casing of a pneumatic tire valve of the type specified, 2 the valve proper arranged therein, and 3 the valve stem. As shown the valve tube or casing 1 is provided with external screw threads 4.

The valve opening device, constituting my improved attachment, comprises a ring 5, internally threaded as at 6, to engage the threads of the valve casing, and provided with a milled rim 7 whereby it may be gripped for adjustment as occasion requires. The ring carries an arched portion or bridge 8, the cross piece 9 of which is provided with an inwardly projecting pin 10 arranged parallel with the side arms of the bridge and in alinement with the axis of the ring. When the ring is applied in position upon the valve casing, the outer end of the casing extends into the space between the arms of the bridge and the outer end of the valve stem is arranged in alinement with the pin 10. It will, therefore, be understood that by screwing the ring inwardly on the valve casing the pin will be correspondingly adjusted and will engage the valve stem, whereby the latter may be forced inwardly and the valve unseated to permit of the escape of air from the tube or tire. The pin is preferably provided with a reduced inner end having a socket or recess to receive the end of the stem, thus insuring a positive connection therebetween, and said pin is of less diameter than the opening in the outer end of the casing, thus permitting of the free escape of air.

As is well known, it is frequently necessary for an automobilist to remove the outer casing of a damaged double tube tire, for the application of a new casing, in order to prevent a blow-out or disruption of the inner tube. This requires the removal of the valve, with a loss of time and possibility of loss of the valve or of injury thereto. In testing inner tubes for leakages, by submerging the same in water, it is also customary to remove the valve after the test has been made and a leak found, in order to deflate the tube for the purpose of repairing or patching the same. My invention obviates these objections, as by its use the valve may be opened and held unseated to permit of the deflation of the tire in a ready and convenient manner.

I claim:—

As a new article of manufacture, a valve opening device for the valves of pneumatic tires, comprising an internally threaded ring, an arch rigid with and projecting from one of the faces of the ring, and a pin rigid with and supported by the crown of the arch between the sides of the arch and in line with the axis of the ring, said pin being provided with a reduced portion having a seat recess therein to receive and engage the end of the valve stem.

In testimony whereof I affix my signature in presence of two witnesses.

THOMAS J. O'LEARY.

Witnesses:
GEO. C. LAMBERT,
GEO. E. LEACH.

Copies of this patent may be obtained for five cents each, by addressing the "Commissioner of Patents, Washington, D. C."